(12) United States Patent
Zhao et al.

(10) Patent No.: US 12,144,434 B2
(45) Date of Patent: *Nov. 19, 2024

(54) FURNITURE ACCESSORY INCLUDING POWER INTERFACES

(71) Applicant: eMoMo Technology Co., Ltd., Shenzhen (CN)

(72) Inventors: Yushu Zhao, Shenzhen (CN); Wenji Tang, Shenzhen (CN); Jing Song, Shenzhen (CN)

(73) Assignee: eMoMo Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,337

(22) Filed: Aug. 14, 2023

(65) Prior Publication Data

US 2024/0032696 A1 Feb. 1, 2024

Related U.S. Application Data

(63) Continuation of application No. 17/168,233, filed on Feb. 5, 2021, now Pat. No. 11,751,692.

(51) Int. Cl.
*A47C 7/54* (2006.01)
*A47C 7/62* (2006.01)
*A47C 7/72* (2006.01)
*B60N 2/75* (2018.01)

(52) U.S. Cl.
CPC ............. *A47C 7/624* (2018.08); *A47C 7/541* (2018.08); *A47C 7/546* (2013.01); *A47C 7/622* (2018.08); *A47C 7/72* (2013.01); *B60N 2/787* (2018.02); *B60N 2/793* (2018.02); *B60N 2/797* (2018.02)

(58) Field of Classification Search
CPC ......... A47C 7/624; A47C 7/546; A47C 7/622; A47C 7/72
See application file for complete search history.

(56) References Cited

U.S. PATENT DOCUMENTS

| | | | |
|---|---|---|---|
| 2,704,114 A | * | 3/1955 | Williams ............... A47C 7/546 297/411.24 |
| 3,634,925 A | | 1/1972 | Van Loo |
| D240,869 S | | 8/1976 | Marr |

(Continued)

FOREIGN PATENT DOCUMENTS

| | | |
|---|---|---|
| DE | 20214711 | 3/2004 |
| JP | 2006149465 | 6/2006 |

(Continued)

OTHER PUBLICATIONS

United States Patent and Trademark Office, Office Action issued for U.S. Appl. No. 17/168,233 on Feb. 24, 2023.

*Primary Examiner* — Robert Canfield
(74) *Attorney, Agent, or Firm* — Womble Bond Dickinson (US) LLP (57) ABSTRACT

A furniture accessory includes an armrest body and an insertion plate moveably coupled to the armrest body and configured for mounting to a furniture item. The furniture accessory may include a power output assembly for receiving and providing power to a detachable electrical accessory. The furniture accessory may include a power input interface and a power supply circuit for providing power from an external power source to the power output interface.

19 Claims, 7 Drawing Sheets

(56) References Cited

U.S. PATENT DOCUMENTS

| | | | |
|---|---|---|---|
| 4,262,962 A * | 4/1981 | Yust | A47C 7/624 |
| | | | 297/145 |
| D260,823 S | 9/1981 | Stulik, Jr. | |
| 4,576,351 A * | 3/1986 | Brink | A61G 5/12 |
| | | | 248/214 |
| D317,674 S | 6/1991 | Smith | |
| D323,932 S | 2/1992 | Hudgens | |
| 5,302,000 A * | 4/1994 | Ayotte | A47C 7/68 |
| | | | 297/188.2 |
| 5,318,340 A | 6/1994 | Henry | |
| D350,866 S * | 9/1994 | Miller | D6/595 |
| D358,578 S | 5/1995 | Walker | |
| D358,956 S | 6/1995 | Mitjans | |
| D359,945 S | 7/1995 | Cameron | |
| D374,856 S | 10/1996 | Berninger | |
| D376,345 S | 12/1996 | Hough | |
| 5,865,503 A | 2/1999 | Sheilds, Jr. | |
| 5,911,472 A * | 6/1999 | Toth | A47C 7/546 |
| | | | 297/188.2 |
| 6,017,091 A | 1/2000 | Cao | |
| D423,836 S | 5/2000 | Bergin | |
| D442,375 S | 5/2001 | Stammberger | |
| D448,580 S | 10/2001 | Carlson | |
| D455,018 S | 4/2002 | Myers et al. | |
| D457,363 S | 5/2002 | Fisher | |
| 6,523,894 B1 * | 2/2003 | Mellace | A47C 1/14 |
| | | | 297/183.5 |
| 6,659,561 B1 | 12/2003 | Lee | |
| D535,484 S | 1/2007 | May | |
| 7,175,217 B1 | 2/2007 | Lota | |
| D541,064 S | 4/2007 | Miller et al. | |
| D551,869 S | 10/2007 | Zambelli | |
| D572,916 S | 7/2008 | Galardo et al. | |
| D580,664 S | 11/2008 | Cramer et al. | |
| D622,516 S | 8/2010 | Delmestri | |
| 7,766,293 B2 | 8/2010 | Seidl et al. | |
| 8,066,332 B2 * | 11/2011 | Huang | A61G 5/12 |
| | | | 297/411.36 |
| D654,708 S | 2/2012 | Mitjans | |
| 8,336,963 B1 * | 12/2012 | DeMonaco | A47C 17/04 |
| | | | 297/411.27 |
| D699,043 S | 2/2014 | McNae | |
| 8,672,401 B2 * | 3/2014 | Schreiber | B60N 2/24 |
| | | | 5/652 |
| 8,795,015 B1 * | 8/2014 | Nguyen | B63B 34/52 |
| | | | 441/130 |
| 8,807,051 B2 | 8/2014 | Johnson | |
| D716,564 S | 11/2014 | Dix | |
| D723,829 S | 3/2015 | Dix | |
| D726,469 S | 4/2015 | Dix | |
| D740,575 S | 10/2015 | Scott | |
| D760,504 S | 7/2016 | Dix | |
| D782,218 S | 3/2017 | Dix | |
| D786,597 S | 5/2017 | Gao | |
| D804,210 S | 12/2017 | Pons | |
| 9,895,000 B2 | 2/2018 | Hassman | |
| D818,282 S | 5/2018 | Li | |
| 10,118,527 B2 * | 11/2018 | Ott | B60N 3/10 |
| D836,351 S | 12/2018 | King | |
| 10,219,629 B2 | 3/2019 | Serena | |
| 10,399,588 B1 * | 9/2019 | Grantham, IV | A61G 5/125 |
| 10,463,157 B1 | 11/2019 | Liniado | |
| 10,517,406 B2 * | 12/2019 | McAlpine | A47C 17/37 |
| D883,685 S | 5/2020 | Carter | |
| D889,889 S | 7/2020 | Tang | |
| D894,655 S | 9/2020 | Cook | |
| D898,389 S | 10/2020 | Rottet | |
| 10,898,002 B1 * | 1/2021 | Sperry | H04R 5/023 |
| D922,305 S | 6/2021 | Yuhasz | |
| D937,779 S * | 12/2021 | Tang | D13/133 |
| D941,602 S | 1/2022 | Lin | |
| 11,553,794 B2 | 1/2023 | Zhou | |
| D979,310 S | 2/2023 | Tang | |
| D985,299 S | 5/2023 | Collier | |
| 2002/0089217 A1 * | 7/2002 | Scheerhorn | B60R 7/04 |
| | | | 297/188.19 |
| 2006/0085940 A1 | 4/2006 | Chernoff | |
| 2008/0290680 A1 | 11/2008 | Busha | |
| 2010/0219671 A1 | 9/2010 | Huang | |
| 2012/0086184 A1 | 4/2012 | Derks | |
| 2012/0119557 A1 | 5/2012 | Fang | |
| 2012/0242115 A1 * | 9/2012 | Schreiber | B60N 2/7005 |
| | | | 297/180.12 |
| 2013/0264855 A1 * | 10/2013 | Huang | A47C 1/0307 |
| | | | 297/411.35 |
| 2013/0320689 A1 | 12/2013 | Hishon | |
| 2014/0139001 A1 | 5/2014 | Bauer | |
| 2015/0084393 A1 * | 3/2015 | Chang | A47C 7/546 |
| | | | 297/411.23 |
| 2015/0298588 A1 | 10/2015 | Lorey | |
| 2016/0029804 A1 * | 2/2016 | Milstead | A47C 7/62 |
| | | | 220/772 |
| 2018/0049552 A1 | 2/2018 | Tsai | |
| 2018/0118061 A1 | 5/2018 | Salvia, III | |
| 2018/0191178 A1 | 7/2018 | Byrne | |
| 2019/0099003 A1 | 4/2019 | Patrick | |
| 2019/0192363 A1 | 6/2019 | Mower | |
| 2019/0328141 A1 | 10/2019 | Cheng | |
| 2020/0153259 A1 | 5/2020 | Bober | |
| 2021/0007498 A1 | 1/2021 | Dorsainvil | |
| 2021/0031660 A1 | 2/2021 | Yamamoto | |
| 2021/0034731 A1 | 2/2021 | Wright | |
| 2021/0153656 A1 | 5/2021 | Hudiburg | |
| 2021/0235874 A1 | 8/2021 | Rafieha | |
| 2021/0402211 A1 | 12/2021 | Lin | |
| 2022/0022656 A1 | 1/2022 | Zhao et al. | |
| 2022/0115907 A1 * | 4/2022 | Bober | H02J 50/005 |

FOREIGN PATENT DOCUMENTS

| | | |
|---|---|---|
| JP | 2019209853 | 12/2019 |
| WO | 2010002261 | 1/2010 |

* cited by examiner

FURNITURE ACCESSORY INCLUDING POWER INTERFACES

CROSS-REFERENCE TO RELATED APPLICATIONS

This application is a Continuation application of U.S. patent application Ser. No. 17/168,233 filed Feb. 5, 2021, which claims priority to CN Patent Application No. 202021497980.8 filed Jul. 24, 2020, the entire contents of each of which are incorporated herein by reference.

BACKGROUND OF THE DISCLOSURE

Over the years, developments in technology-enabled furniture have transformed the concept of a smart home into a practical reality. Furniture equipped with information transmission and control component technology continues to replace traditional furniture items that lack the technical functionality and aesthetic qualities that are desired in today's developing smart home.

Furniture accessories that have traditionally provided utility can also be improved by the incorporation of information transmission and/or control component technology. For example, conventional armrests that are generally permanently installed on one or both ends of the furniture item (e.g., sofa, chair, sectional couch) have traditionally been used only for supporting a user's arm and to serve as boundaries of a seat. With the existing design, the armrest can neither support the arms of a person in a middle seat spaced away from either end of the furniture item, nor meet the connectivity requirements of consumers in an intelligent era. Typical armrests are generally integrally formed with the furniture item so that they are non-moveable or difficult to adjust or remove for maintenance or cleaning. These conventional armrests also do not include embedded technology allowing for electrical connectivity and information transmission, which can limit the overall technical functionality of a furniture item that may otherwise be equipped with such capabilities.

In view of the above deficiencies of conventional furniture accessories, a need exists for a moveable furniture accessory equipped with connection components to a power supply that do not interfere with the aesthetic appeal of the furniture item or accessory. A further need exists for a technology-equipped furniture accessory that incorporates storage for additional electrical and non-electrical accessories.

BRIEF DESCRIPTION OF THE EXEMPLARY EMBODIMENTS

In an aspect, the disclosure relates to a furniture accessory. The furniture accessory may have an armrest body including a top wall, a bottom wall, and at least one side wall. An insertion plate may be moveably coupled to the armrest body. The bottom wall of the armrest body may have an insertion plate interface including an interface track for receiving the insertion plate and securing the insertion plate to the armrest body.

In another aspect, the disclosure relates to an electrically connectable furniture accessory. The electrically connectable furniture accessory may have an armrest body. A power output interface and a power input interface may be provided on the armrest body. The power input interface may be configured for electrically connecting to an external power source and for providing power from the external power source to the power output interface.

In another aspect, the disclosure relates to a furniture accessory having an armrest body including a top wall, a bottom wall, a rear wall, a first side wall, and a second side wall opposite and spaced apart from the first side wall. The first side wall and the second side wall may extend from the top wall to the bottom wall. An insertion plate may be moveably coupled to the bottom wall of the armrest body and be configured to mount the armrest body to a furniture item. A power output assembly may be provided on the top wall of the armrest body and be configured for receiving a detachable accessory.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments.

For purposes of this disclosure, "connection" or "connected" may refer to an electrical connection and/or a physical connection, as the disclosure makes clear. In the context of an electrical connection, "connection" and "connected" respectively mean a conductive electrical contact or communication and in conductive electrical contact or communication, including, for example and without limitation, one or more physical connections between conductive components, either directly or through intermediate conductive components or relays, through which electricity is transmitted and/or transferred. The terms "electrical" and "electric" may be used interchangeably and refer to power aspects of electricity and associated components including, among other things, power supplies, power connections and relays, devices powered by electricity, and the like, except where the disclosure otherwise makes clear.

Where the disclosure makes clear that "connection" or "connected" refers to a purely physical connection, "connection" and "connected" respectively mean a physical joining and physically joined by any known technique, including integrally formed as single, integral (or, e.g., "monolithic") piece.

For purposes of this disclosure, relative terms including, without limitation, "top", "bottom", "rear", "front", "upper", "lower", "above", "below", "within", and the like are used to aid the description of, e.g., configurations of features as shown in the accompanying figures, and otherwise as the disclosure makes clear. Such relative terms do not imply any particular dimension or delineation of or between features except where the disclosure makes clear.

For purposes of this disclosure, terms including, without limitation, "first", "second", "third" and "fourth" are used for descriptive purposes only and without limitation with respect to, e.g., an ordering of process steps, function, or configuration.

For purposes of illustrating features of the embodiments, an exemplary embodiment will now be introduced and referenced throughout the disclosure. It will be understood that this example and other exemplary embodiments described in this disclosure are illustrative and not limiting and are provided for illustrating the exemplary features of a furniture accessory equipped with a power supply.

With reference to FIGS. 1-4, an exemplary embodiment of a furniture accessory 100 may be, e.g., an armrest that includes an armrest body 101 formed from a plurality of walls (e.g., a top wall 102, a bottom wall 103, a front wall 104 (FIGS. 6-8), a rear wall 105, and a side wall 106). In an aspect, the armrest body 101 may include the top wall 102, the bottom wall 103, and at least one side wall 106.

An insertion plate 114 may extend away from the bottom wall 103 of the armrest body 101. The insertion plate 114 may be configured for mounting to a furniture item, such as a couch, armchair, sofa, sectional, or the like, to mount the armrest body 101 to the furniture item. For purposes of this disclosure, "mount", "mounting", and other variants mean, generally and without limitation, securing in place, including removably securing in place. In an aspect, the insertion plate 114 is configured for insertion into a portion of the furniture item, for example in a gap between two seat cushions of the furniture item.

The armrest body 101 may include storage features such as a storage compartment or box (i.e., hollow interior 108 (FIG. 2)), a cupholder 109, and/or or a mobile device storage slot (not shown). It should be understood from this disclosure that the structural arrangement, number, dimensions, etc. of storage features in the armrest body 101 may be adjusted depending on the needs of the application. For example and not limitation, two cupholders may be provided on the top wall 102 in a spaced apart position from the front wall 104 for use by users sitting on either side of the armrest body 101. According to an aspect, the cupholder 109 may be defined by, as is well known, a circularly- or otherwise shaped opening formed in the top wall 102, and a cylindrical wall 109a extending downwardly from the opening to a bottom wall 109b. In an aspect, the cupholder 109 may be sized and shaped to receive an adapter end of a detachable accessory, such as a beverage container support stand, a mobile device holder, a book stand, a rotary tray, and the like. Similarly, it is understood that other storage features may be configured with an appropriately-shaped opening in the top wall 102 and a correspondingly-shaped wall extending downwardly from the opening to a bottom wall. For example, the mobile device storage slot may be defined by a rectangular opening formed in the top wall 102, and a corresponding rectangular wall and bottom wall, for placement and storage of a mobile device such as a smart phone.

Figure 1:
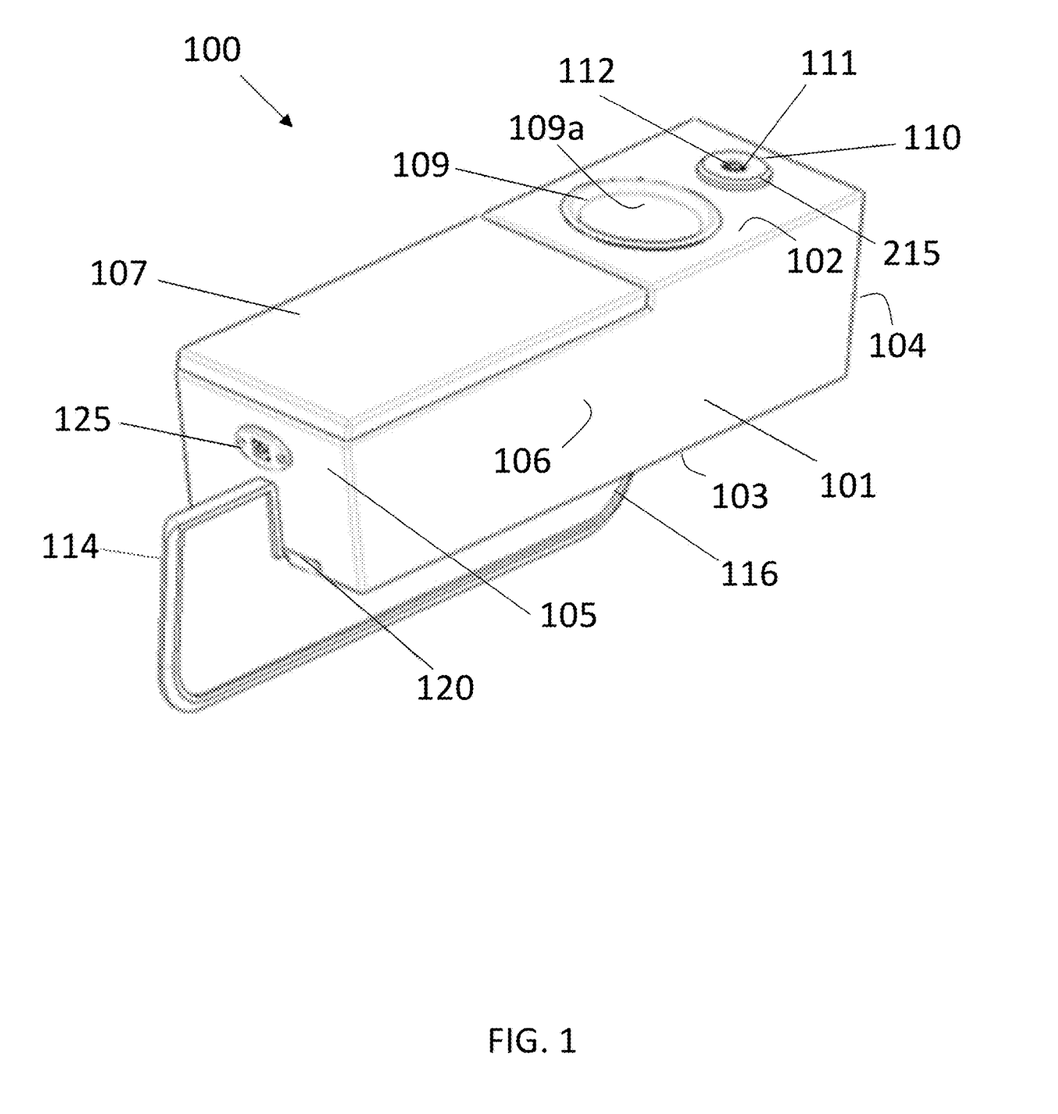
FIG. 1 is a rear, top, right perspective view of a smart furniture accessory, according to an exemplary embodiment.
Figure 2:
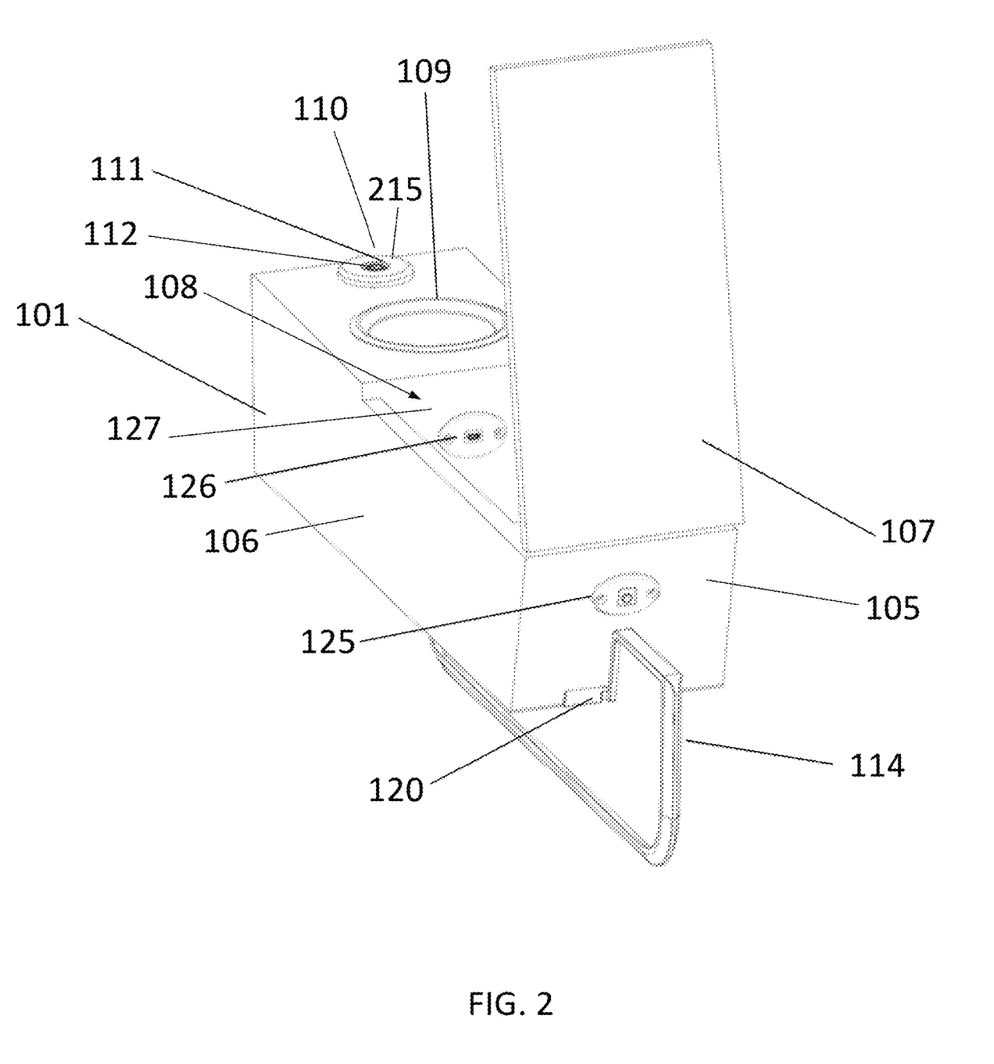
FIG. 2 is a rear, top, left perspective view of a smart furniture accessory, according to an exemplary embodiment.
Figure 3:
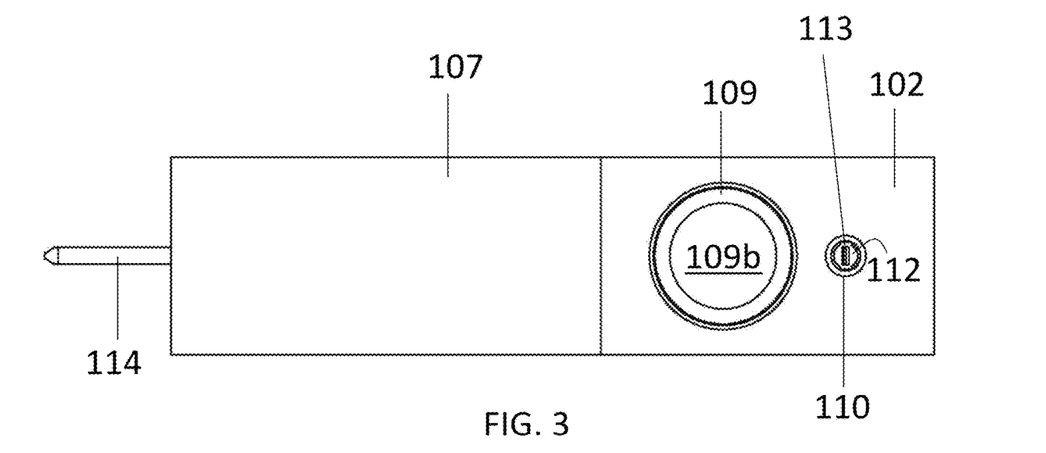
FIG. 3 is a top elevated view of a smart furniture accessory, according to an exemplary embodiment.

With continuing reference to FIGS. 1 and 2, the armrest body 101 may include the hollow interior 108 defined by a plurality of walls, which, for purposes of this disclosure, may include a cover plate 107. For example, the armrest body 101 may include, and the hollow interior 108 may be defined by, the bottom wall 103, the rear wall 105, opposing side walls 106, one or more inner walls 127, and a cover plate 107 in a first position (FIG. 1). It is understood that the armrest body 101 according to the disclosure is discussed, e.g., with respect to the configuration and relationship of particular walls and structures, to aid in the understanding of the same. However, the armrest body 101 is not so limited and may, where consistent and not expressly indicated otherwise, include any component, wall, and the like which forms a portion of the overall armrest structure. According to the exemplary embodiments, without limitation, the side walls 106 are positioned opposite to and spaced apart from each other, and each side wall 106 extends from the bottom wall 103 to the top wall 102. The inner wall 127 extends from the top wall 102 to the bottom wall 103 and the rear wall 105 extends upwardly from the bottom wall 103. In the exemplary embodiment, the rear wall 105 is parallel, or close thereto, with the inner wall 127, and spaced apart therefrom. The top wall 102 extends from the front wall 104 to the inner wall 127, and the cover plate 107 in the first position is adjacent to the top wall 102 and co-planar, or close thereto, with the top wall 102. Accordingly, each side wall 106 extends from the bottom wall 103 to the cover plate 107 in the first position.

For purposes of this disclosure, "adjacent" means near or in relative proximity but is not limited to any particular dimensions or spacing, except where otherwise made clear by the disclosure, and further includes configurations in which components are "adjacent" for purposes of accomplishing a function such as defining a structure or area, making an electrical connection, or opening to an electrical contact.

The cover plate 107 may extend from the top wall 102 to the rear wall 103. The cover plate 107 may be connected to the rear wall 105, for example by a hinged connection along an upper edge of the rear wall 105, such that the cover plate 107 is moveable between the first position and a second position (FIG. 2). The hollow interior 108 is accessible with the cover plate 107 in the second position—i.e., a top of the hollow interior 108 is open to an outside of the armrest body 101. In an aspect, the hollow interior 108 is a storage compartment provided in a spaced apart configuration from the cupholder 109. Personal items and accessories, such as eyeglasses, watches, mobile devices, keys, or mobile power supplies, may be stored in the hollow interior 108.

In an aspect, the armrest body 101 may include less than all of the above-mentioned storage features, or no storage features. It is understood that, in various embodiments, the furniture accessory 100 may not include an accessible hollow interior 108 as a storage area, in which case, for example, the top wall 102 may from the front wall 104 to the rear wall 105. In other embodiments, the top wall 102 may be movably connected to the rear wall 105 in a manner such as the cover plate 107 in the exemplary embodiments, and extend therefrom to the front wall 104, such that the entire area between the front wall 104 and the rear wall 105 may be an accessible hollow interior when the top wall 102 is in a second, i.e., open, position. In still further embodiments, the cover plate 107 (or, as discussed, a moveable top wall) may be moveably connected to one of the side walls 106, the front wall 104, or the inner wall 127, or any component or structure generally consistent with this disclosure.

An exemplary embodiment may include, without limitation, a power supply circuit (not shown), as are known, provided in the armrest body 101. The power supply circuit may supply electrical power from an external power source (as discussed further below) connected to the armrest body 101 via one or more power input interfaces (e.g., outer power input interface 125 and/or inner power input interface 126) provided on the armrest body 101. The power supply circuit may supply electrical power to a power output interface (e.g., power output interface 112) provided on the armrest body 101, to power an electrical accessory connected to the armrest body 101. In an aspect, the power supply circuit may be configured to provide at least about 5V up to about 36V of power to the power output interface 112 to power the electrical accessory. However, power may be provided in any amount/manner consistent with this disclosure and/or known power supplies and power circuits/interfaces.

In an aspect, the power supply circuit may be connected to one or more power input interfaces, for example, an outer power input interface 125 provided on an external wall (e.g., front wall 104, bottom wall 103, rear wall 105, or side wall 106) of the armrest body 101, and/or an inner power input interface 126 provided on an inner wall (e.g., inner wall 127) of the hollow interior 108. The outer power input interface 125 may be provided on the rear wall 105 of the armrest body 101. The power input interfaces 125, 126 may be configured for connection to an external power source. In an aspect, the outer power input interface 125 may receive a power cord extending from an external power source, for example, a standard wall outlet. In an embodiment, the power cord from the external power source may extend through a portion of a furniture item concealed from view during use, e.g., passed through the cushions of a sofa, to the outer power input interface 125.

In an aspect, the inner power input interface 126 may be provided on the inner wall 127 of the hollow interior 108 and configured for connection to an external power source, such as a portable rechargeable battery. In an aspect, the portable rechargeable battery may be installed or removably stored in the hollow interior 108 for convenient and discrete connection of the external power source to the power supply circuit via the internal power input interface 126. Accordingly, the furniture accessory 100 in an aspect is moveable (e.g., without limitation, portable between locations, repositionable on a furniture item, functional away from a furniture item and/or a non-portable external power source, and the like) with respect to connecting to an external power source and providing electrical power to an electrical accessory attached to the armchair body 101.

Figure 10:
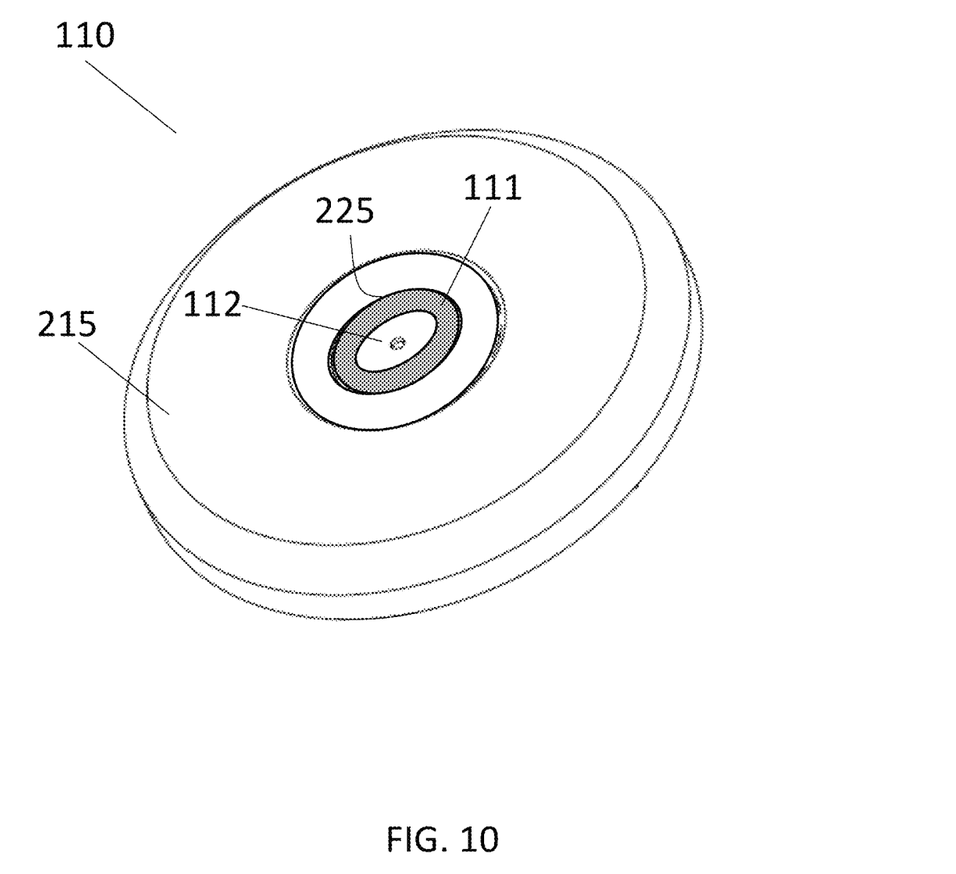
FIG. 10 is a perspective view of a power output assembly, according to an exemplary embodiment.

In an aspect, and with additional reference to FIG. 10, a power output assembly 110, including an assembly body 215, a support gap slot 111 and a power output interface 112, may be provided on the armchair body 101 and connected to the power supply circuit to provide power to the electrical accessory. In an aspect, and with reference to FIGS. 1-3, the power output assembly 110 may be provided adjacent the front wall 104 of the armrest body 101 near the cupholder 109. In the same manner as described above with reference to storage features of the armrest body 101, more than one power output assembly 110 may be provided in the armrest body 101.

The support gap slot 111 may be an annular receptacle that extends into the power output assembly 110, i.e., the assembly body 215, between the power output interface 112 and an inner wall 225 of the assembly body 215. The power output assembly 110, i.e., the support gap slot 111, may be configured for receiving and supporting, within the support gap slot 111, a detachable accessory with a complementary annular portion. In an aspect, the detachable accessory may be an electrical accessory, for example and not limitation, a battery charging device (e.g., provided as part of a mobile electronic device holder), a reading light, a fan, or a small household appliance adapted to an input voltage ranging from about 5V to 36V. In an aspect, the support gap slot 111 may also be appropriate for supporting an adapter end of a detachable non-electrical accessory, such as a beverage container support stand, a book stand, a rotary tray, and the like. The detachable accessory, the power output assembly, and configuration and operation generally of a detachable electrical accessory connected to the power output assembly 110 may be as described in U.S. Pat. No. 11,421,867 issued Aug. 23, 2022, which is commonly owned by eMoMo Technology Co., Ltd. and incorporated by reference herein in its entirety.

In an exemplary embodiment, the support gap slot 111 is configured to receive a detachable electrical accessory for electrical connection to the power supply circuit via the power output interface 112. In an aspect, the support gap slot 111 is an annular support gap slot 111 having a circumferential opening provided on the top wall 102 of the armrest body 101.

The annular support gap slot 111 is formed around the power output interface 112 so that an electrical accessory may be inserted into the support gap slot 111 for electrical connection to the power output interface 112. In other words, the power output interface 112 may connect to a power interface within the annular portion of the detachable electrical accessory, e.g., to provide power to the detachable electrical accessory. In an aspect, the power output interface 112 may include, for example, a magnetic electrical interface for automatic, magnetic electrical connection to the electrical accessory, e.g., between mating electrical components, and/or a direct current (DC) connector interface. In addition to or alternatively, and with reference to FIG. 3, the power output interface 112 may be configured with, without limitation, a Universal Serial Bus (USB) port 113.

With additional reference to FIG. 10, an exemplary embodiment of the power output assembly 110 may include, without limitation, the support gap slot 111 encircling the power output interface 112, within an interface body 215, for electrically connecting to the detachable electrical accessory. While not shown, and as discussed above, it is understood that the power output assembly 110 and other components such as the cup holder, and the like, may include a portion, such as interface body 215, on the top wall 102, and a supporting portion that extends from, e.g., the interface body 215, through a corresponding hole in the top wall 102, and into the armrest body 101. It is understood that a power output assembly 110 and/or power output interface 112 positioned on the top wall 102 (or other portion of the armrest body 101) may refer, without limitation, to such an assembly and configuration.

In various embodiments, power output interface(s) may be provided in any number and position on the furniture accessory, e.g., the armrest body 101, consistent with this disclosure. The power supply circuit may be configured for providing power from the external power source to each power output interface. For example, power output interface(s) may be positioned on the inner wall 127, or an inner side of a side wall 106 or the rear wall 105, within the hollow interior 108. Accessories such as, e.g., mobile electronic devices may be charged from such power output interfaces, while stored in the hollow interior 108. It is understood that the furniture accessory 100 may be positioned away from an electrical outlet and the power supply circuit may power electrical accessories from the external power source as described hereinabove. For example and not limitation, the furniture accessory 100 may be positioned on a countertop or flooring surface to be used for storing and/or powering electrical accessories and non-electrical accessories.

With additional reference to FIGS. 4-9, in an aspect, an insertion plate interface 120 may be provided on the bottom wall 103. The insertion plate interface 120 may include an insertion plate interface track 121 for receiving the insertion plate 114 and securing the insertion plate 114 to the armrest body 101. In an exemplary embodiment, the insertion plate interface 120 may be positioned in a recess 119 (FIG. 5A) formed on the bottom wall 103 of the armrest body 101. The recess 119 may be corresponding in width, depth, and length to accommodate positioning of the insertion plate interface 120 such that a surface of the insertion plate interface 120 in which the interface track 121 is formed is flush, or close thereto, with the bottom wall 103 of the armrest body 101. Accordingly, the armrest body 101, in an aspect, may be used without the insertion plate 114 and sit straight when resting on a surface. In the exemplary embodiment, the insertion plate interface 120 is secured in the recess 119 by screws 123 inserted into screw holes 124 through the insertion plate interface 120. In other embodiments, the interface track 121 may be directly formed in the bottom wall 103 of the armrest body 101 by machining the interface track 121 into an armrest body made of, e.g., wood, plastic, metal, etc., such that the interface track 121 is integral to the armrest body 101.

Figure 4:
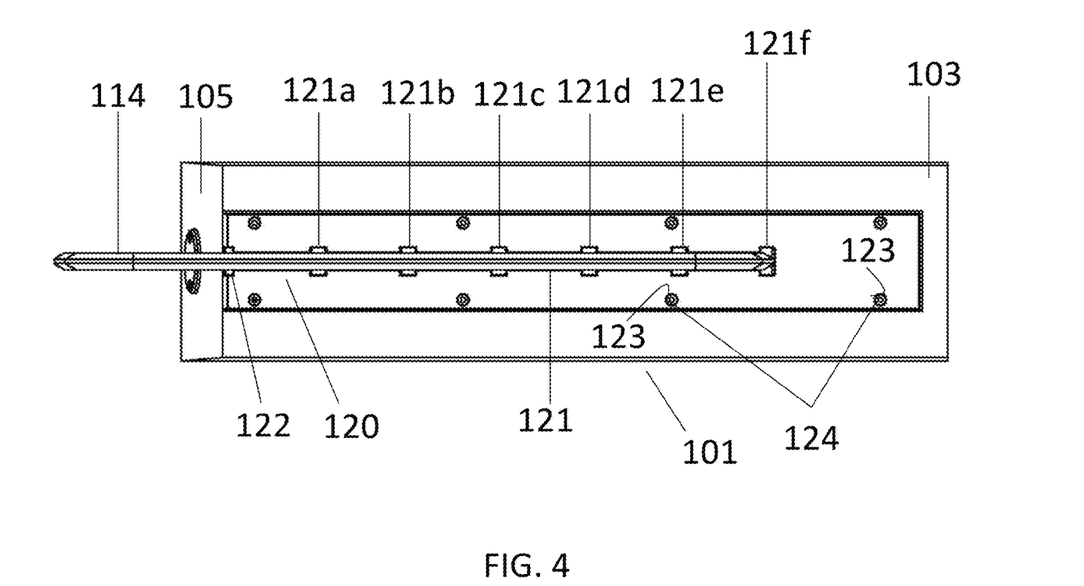
FIG. 4 is bottom elevated view of a smart furniture accessory, according to an exemplary embodiment.
Figures 5A, 5B:
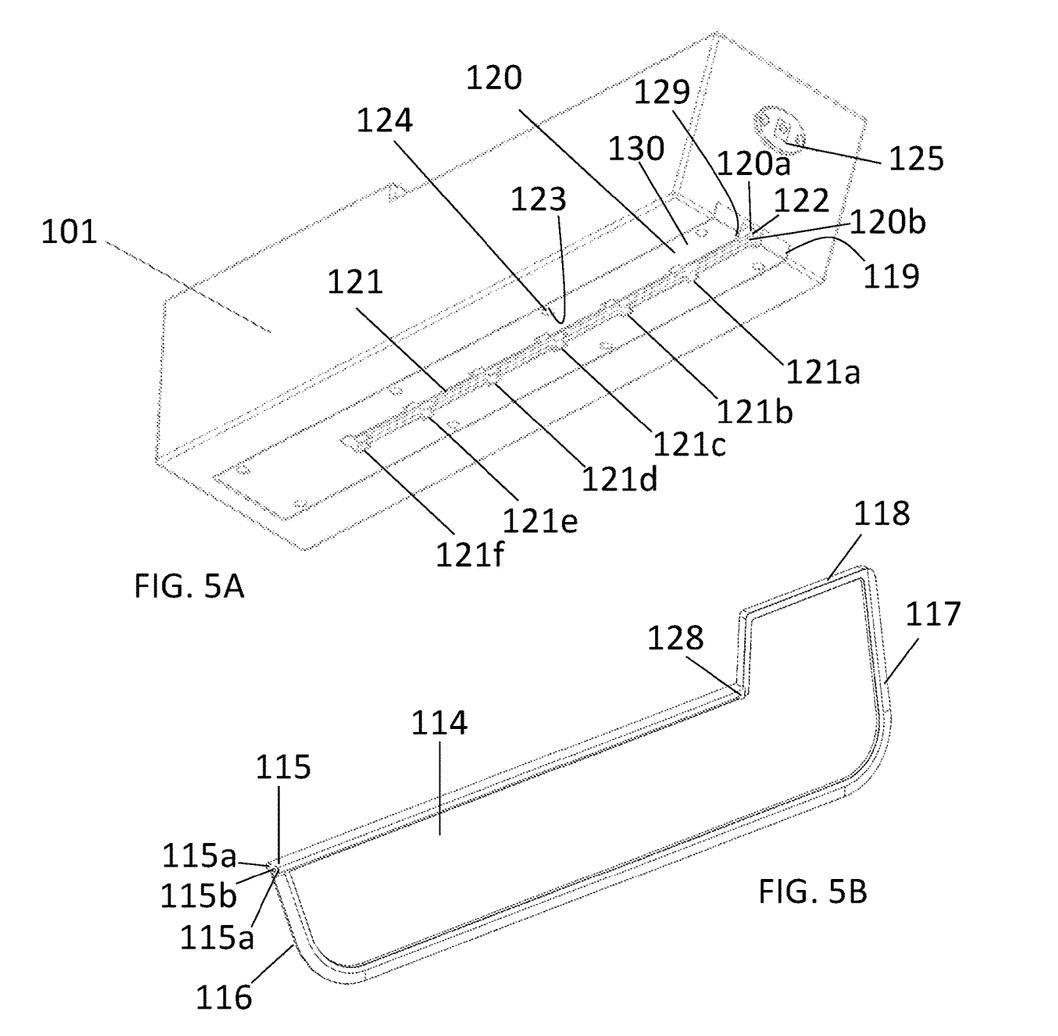
FIG. 5A is a rear, bottom, left perspective view of a smart furniture accessory according to an exemplary embodiment.
FIG. 5B is a top, left perspective view of an insertion plate, according to an exemplary embodiment.

With particular reference to the exemplary embodiments shown in FIGS. 4-5B, the insertion plate 114 is moveably coupled to the armrest body 101 for adjustment of the insertion plate 114 relative to the armrest body 101. In other embodiments, the insertion plate 114 may be integrally formed as a monolithic (i.e., integral) structure with the armrest body 101, and thereby be non-moveably coupled to the armrest body 101. For example and not limitation, the insertion plate 114 and the bottom wall 103, and/or the entire armrest body 101, generally, may be formed from a unitary piece of material.

The interface track 121 may be an opening formed in a surface 130 of the insertion plate interface 120 dimensioned to receive a portion of the insertion plate 114 for coupling to the armrest body 101. In an aspect, the interface track 121 may be a T-shaped slot formed in the insertion plate interface 120. In a further aspect, the T-shaped slot may be configured such that a guiding track 120*a* is recessed from the interface track surface 130 and separated therefrom by an insertion gap 120*b*. A series of L-shaped connectors 121*a*, 121*b*, 121*c*, 121*d*, 121*e*, 121*f* may be positioned at intervals along the interface track 121 and respectively connected at a first end to the insertion plate interface surface 130, and extend therefrom to a second end connected to the guiding track 120*a*. Accordingly, the L-shaped connectors 121*a-f* affix the guiding track 120*a* in position within the insertion plate interface 120, and the insertion gap 120*b* may be defined in the areas between the L-shaped connectors 121*a-f* and may reduce friction as the insertion plate 114 is moved along the interface track 121. The connectors 121*a-f* may further provide, along the length of the interface track 121, consistent resiliency of the guiding track 120*a* relative to the insertion plate interface surface 130, and consistent interface gap 120*b* dimensions, for securing the insertion plate 114 in the interface gap 120*b* (discussed further below).

In an aspect, the insertion plate 114 may be coupled to the interface track 121 by inserting an insertion plate guide 115 positioned on interface plate 114 into the open end 122 of the interface track 121, with a first end 116 of the insertion plate 114 leading a rear portion 117 of the insertion plate 114 as the insertion plate guide 115 is inserted into and advanced along the interface track 121. In an aspect, the insertion plate guide 115 may be formed on a top edge of the insertion plate 114. The interface track 121 and the insertion plate guide 115 may be correspondingly shaped and sized so that the insertion plate guide 115 can be received in and slid along the interface track 121. In the exemplary embodiments shown in FIGS. 5A and 5B, the insertion plate guide 115 includes wings 115*a* extending horizontally away from a central portion 115*b*. The wings 115*a* and the insertion plate 114 thereby form a T-shaped structure that is complementary to and couplable with the T-shaped slot defined by the interface track 121. For example, the wings 115*a* may be received within the insertion gap 120*b* and the insertion plate 114 may extend out of and away from the interface track 121 when the insertion plate 114 is inserted into the interface track 121.

In an aspect, the interface track 121 may extend along the bottom wall 103 from the front wall 104 of the armrest body 101 toward the rear wall 105. In an exemplary embodiment, the interface track 121 may extend along less than entire length of the armrest body bottom wall 103. However, the length of the interface track 121 may be adjusted depending on the needs of the application. For example and not limitation, the interface track 121 may extend along an entire length of the bottom wall 103 from the front wall 104 to the rear wall 105.

In the exemplary embodiment shown in FIG. 5B, a shoulder 128 extending orthogonally away from the insertion plate guide 115 is provided on an end of the insertion plate guide 115 adjacent to a fin 118 of the insertion plate 114. When the insertion plate guide 115 is inserted in the interface track 121, the shoulder 128 will contact and abut a track structure 129 adjacent the open end 122, thereby preventing further movement of the insertion plate 114 along the interface track 121.

Figure 6:
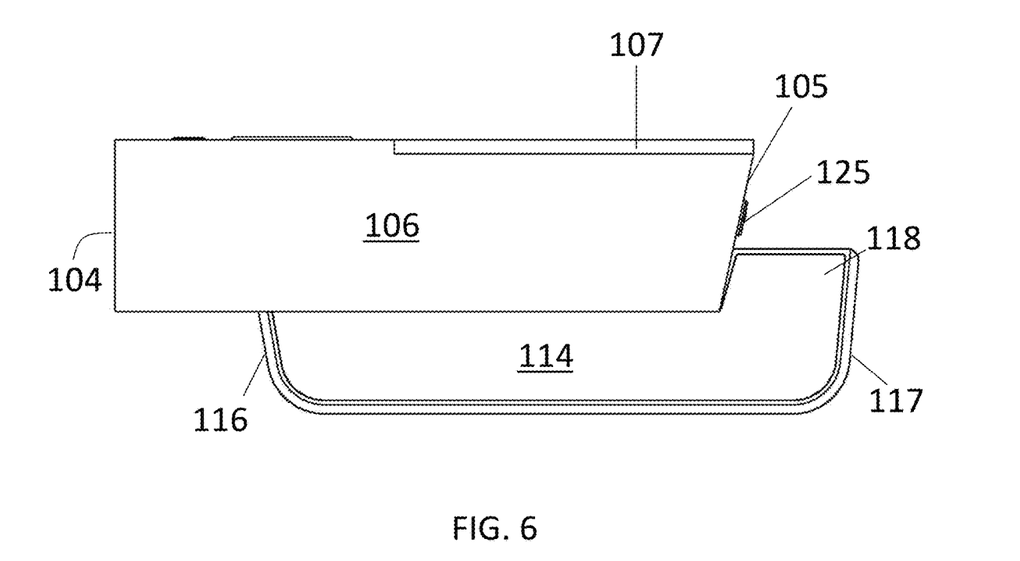
FIG. 6 is a left side view of a smart furniture accessory, according to an exemplary embodiment.
Figure 7:
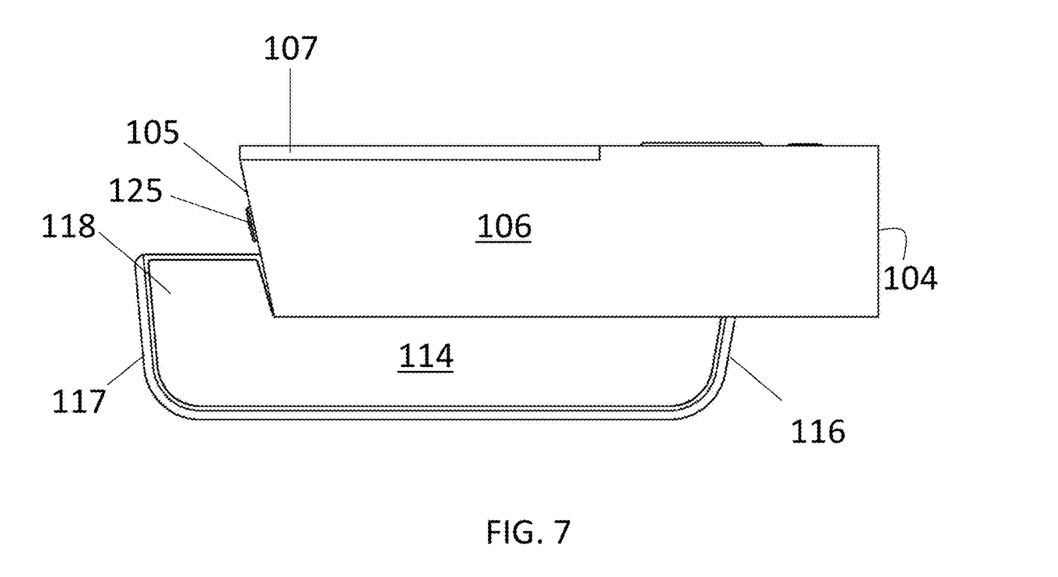
FIG. 7 is a right side view of a smart furniture accessory, according to an exemplary embodiment.
Figure 8:
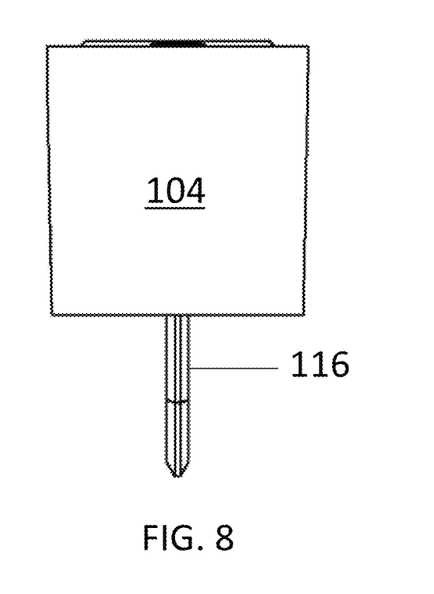
FIG. 8 is a front elevated view of a smart furniture accessory, according to an exemplary embodiment.
Figure 9:
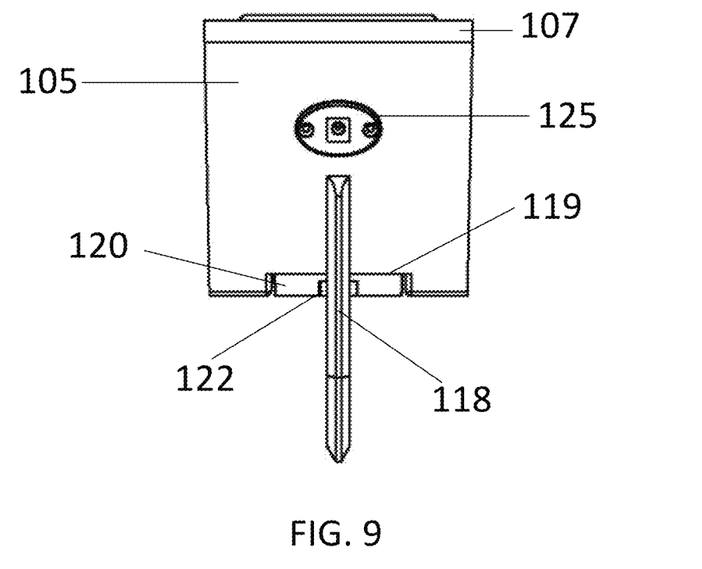
FIG. 9 is a rear elevated view of a smart furniture accessory, according to an exemplary embodiment.

With reference in particular to FIGS. 6 and 7, in an aspect, the insertion plate 114 may extend along a length of the armrest body 101 from the front wall 104 to the rear wall 105, and the fin 118 may extend upwardly at a rear portion 117 of the insertion plate 114. In other words, the fin 118 may be defined by a contour of the insertion plate 114 at the rear portion 117. In other embodiments, the fin 118 may be a separate component joined to the insertion plate 114 or otherwise formed in a manner consistent with this disclosure. In an aspect, the insertion plate 114 may be inserted along the interface track 121 to a position at which the fin 118 is adjacent to and extends away from the rear wall 105 of the armrest body 101, for positioning/mounting in the furniture item, for example in a gap between two cushions (e.g., back cushions on a sofa) of the furniture item.

In various embodiments, and depending on the needs of the application, the insertion plate 114 may have any desired shape, for example L-shaped, rectangular, and the like. In an aspect, the insertion plate 114, once coupled to the armrest body 101, is configured to extend away from at least one of the bottom wall 103 and the rear wall 105, for mounting to the furniture item. In an exemplary embodiment and as illustrated in FIGS. 6 and 7, a front end 116 of the insertion plate 114 does not extend beyond the front wall 104 of the armrest body 101, to completely conceal the insertion plate 114 in the furniture item when the armrest body 101 is mounted on the furniture item.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A furniture accessory for use with a furniture item, comprising:
    an insertion plate configured to be mounted to the furniture item, the insertion plate including:
        a rear portion;
        a fin extending upwardly from the rear portion of the insertion plate; and
    an armrest body slidably supported on the insertion plate; and
    a cover plate movably coupled to the armrest body, wherein the armrest body defines a hollow interior and the cover plate is configured to selectively cover an opening of the hollow interior.

2. The furniture accessory of claim 1, wherein the fin of the insertion plate overlaps with a rear wall of the armrest body.

3. The furniture accessory of claim 2, wherein the fin extends in a rearward direction away from the rear wall of the armrest body.

4. The furniture accessory of claim 1, wherein the armrest body has a top wall, a bottom wall, a rear wall, and a pair of opposed side walls.

5. The furniture accessory of claim 4, wherein the bottom wall of the armrest body includes an interface track for receiving the insertion plate and securing the insertion plate to the armrest body.

6. The furniture accessory of claim 5, wherein the insertion plate includes an insertion plate guide provided on an upper edge of the insertion plate and received and secured in the interface track of the armrest body.

7. The furniture accessory of claim 1, wherein the armrest body includes a support gap slot provided on a top wall of the armrest body, wherein the support gap slot is configured for receiving a detachable accessory.

8. An electrically connectable furniture accessory for use with a furniture item, comprising:
an armrest body having a bottom wall and a rear wall;
an insertion plate slidably coupled to the bottom wall of the armrest body and being configured for mounting to the furniture item, the insertion plate including:
a rear portion; and
a fin extending upwardly from the rear portion of the insertion plate and axially away from the rear wall of the armrest body.

9. The electrically connectable furniture accessory of claim 8, further comprising:
a power output assembly including a power output interface provided on the armrest body; and
a power input interface provided on the armrest body, wherein the power input interface is configured for electrically connecting to an external power source and for providing power from the external power source to the power output interface.

10. The electrically connectable furniture accessory of claim 9, wherein the power output interface includes at least one of a magnetic electrical interface or a direct current interface.

11. The electrically connectable furniture accessory of claim 9, wherein the power output assembly further includes a support gap slot provided around the power output interface, wherein the support gap slot is configured for receiving the electrical accessory for connection to the power output interface.

12. The electrically connectable furniture accessory of claim 9, wherein the armrest body defines a hollow interior, the power input interface being positioned in the hollow interior.

13. The electrically connectable furniture accessory of claim 9, wherein the power output assembly is provided on a top wall of the armrest body.

14. The electrically connectable furniture accessory of claim 9, wherein the power output assembly includes an annular inner wall, the power output interface being positioned concentrically within and radially spaced from the annular inner wall by an annular support gap slot, the annular support gap slot being configured to receive a complementary portion of a detachable accessory such that the complementary portion of the detachable accessory is positioned between the annular inner wall and the power output interface.

15. A furniture accessory for use with a furniture item, comprising:
an armrest body including a bottom wall and a rear wall;
an insertion plate slidably coupled to the bottom wall of the armrest body and configured for mounting to the furniture item, the insertion plate including:
a rear portion; and
a fin extending upwardly from the rear portion of the insertion plate, wherein the fin overlaps with and extends in a rearward direction away from the rear wall of the armrest body; and
a power output assembly coupled to the armrest body and configured for receiving a detachable accessory.

16. The furniture accessory of claim 15, wherein the detachable accessory is at least one of a reading light, a fan, a charger, a handheld equipment support, a cup holder, a book support, or a rotary tray.

17. The furniture accessory of claim 15, further comprising a cup holder coupled to the armrest body.

18. The furniture accessory of claim 15, wherein the bottom wall of the armrest body includes an interface track for receiving the insertion plate and securing the insertion plate to the armrest body.

19. The electrically connectable furniture accessory of claim 15, wherein the power output assembly includes:
an annular inner wall; and
an annular power output interface positioned concentrically within and radially spaced from the annular inner wall by an annular support gap slot, the annular support gap slot being configured to receive a complementary portion of a detachable accessory such that the complementary portion of the detachable accessory is positioned between the annular inner wall and the annular power output interface.

* * * * *